US012574115B2

(12) United States Patent
Hirota et al.

(10) Patent No.: US 12,574,115 B2
(45) Date of Patent: Mar. 10, 2026

(54) FREE-SPACE OPTICAL COMMUNICATION APPARATUS CONTROL APPARATUS, FREE-SPACE OPTICAL COMMUNICATION APPARATUS CONTROL SYSTEM, AND FREE-SPACE OPTICAL COMMUNICATION APPARATUS CONTROL METHOD

(71) Applicant: NEC Corporation, Tokyo (JP)

(72) Inventors: Shingo Hirota, Tokyo (JP); Hisashi Mizumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 323 days.

(21) Appl. No.: 18/385,486

(22) Filed: Oct. 31, 2023

(65) Prior Publication Data

US 2024/0171274 A1      May 23, 2024

(30) Foreign Application Priority Data

Nov. 17, 2022    (JP) ................................. 2022-184390

(51) Int. Cl.
*H04B 10/112*        (2013.01)
*A01G 17/00*        (2006.01)
*H04B 10/50*        (2013.01)

(52) U.S. Cl.
CPC ......... *H04B 10/112* (2013.01); *A01G 17/005* (2013.01); *H04B 10/503* (2013.01)

(58) Field of Classification Search
None
See application file for complete search history.

(56) References Cited

U.S. PATENT DOCUMENTS

| | | | | |
|---|---|---|---|---|
| 5,229,593 A | * | 7/1993 | Cato | ........................ G02B 3/00 |
| | | | | 250/551 |
| 6,381,055 B1 | * | 4/2002 | Javitt | ................. H04B 10/1123 |
| | | | | 398/131 |
| 2002/0089727 A1 | * | 7/2002 | Alwan | ................... H04B 10/40 |
| | | | | 398/192 |
| 2009/0324235 A1 | * | 12/2009 | Butler | ................... E05F 17/004 |
| | | | | 398/112 |

FOREIGN PATENT DOCUMENTS

| | | |
|---|---|---|
| JP | H04-169131 A | 6/1992 |
| JP | 2005-252842 A | 9/2005 |
| JP | 2009-131223 A | 6/2009 |
| JP | 2012-186662 A | 9/2012 |
| JP | 2012-187091 A | 10/2012 |

* cited by examiner

*Primary Examiner* — David W Lambert
(74) *Attorney, Agent, or Firm* — Sughrue Mion, PLLC

(57)        ABSTRACT

A free-space optical communication apparatus control apparatus includes: a detecting section for detecting an impediment to laser communication of a free-space optical communication apparatus; and a judging section for judging, in accordance with the state of the impediment to the laser communication, whether pruning of a tree is necessary.

9 Claims, 6 Drawing Sheets

FREE-SPACE OPTICAL COMMUNICATION APPARATUS CONTROL APPARATUS, FREE-SPACE OPTICAL COMMUNICATION APPARATUS CONTROL SYSTEM, AND FREE-SPACE OPTICAL COMMUNICATION APPARATUS CONTROL METHOD

CROSS REFERENCE TO RELATED APPLICATIONS

This application is based upon and claims the benefit of priority from Japanese Patent Application No. 2022-1843 90 filed on Nov. 17, 2022, the disclosure of which is incorporated herein in its entirety by reference.

TECHNICAL FIELD

The present invention relates to a technique for judging, in accordance with the state of an impediment to laser communication, whether pruning of a tree is necessary.

BACKGROUND ART

For example, in a case where there is a tree having been grown enough to hang over an electric wire, on a path of free-space optical communication (laser communication), which is wireless communication via laser light, i.e., on an optical path, the laser communication is impeded by the tree. This could make free-space optical communication impossible. In order for such a tree to be immediately pruned, there is demand for a technique of detecting a tree which could impede laser communication to judge whether pruning is necessary.

Conventionally, the judgment (determination) on whether pruning of a tree is necessary has been visually made by a pruner. Patent Literature 1 discloses a technique of applying laser light to judge, in accordance with the intensity of the reflected light, whether pruning of a tree is necessary.

CITATION LIST

Patent Literature

[Patent Literature 1]
Japanese Patent Application Publication, Tokukai, No. 2012-187091

SUMMARY OF INVENTION

Technical Problem

However, the visual judgment on whether pruning of a tree is necessary causes an error resulting from manual judgment, makes it impossible to objectively and efficiently judge whether pruning of a tree is necessary, and entails personnel costs for a pruner's check, etc. Thus, in a case of visual judgment on whether pruning of a tree is necessary, it has been impossible to judge, at low cost and with high accuracy, whether pruning of a tree is necessary. In addition, the technique disclosed in Patent Literature 1 requires an additional apparatus for receiving reflected light to detect a tree which could impede laser communication, and it is therefore impossible to judge, at low cost, whether pruning of a tree is necessary.

An example object of an example aspect of the present disclosure is to provide: a free-space optical communication apparatus control apparatus capable of judging, at low cost and with high accuracy, whether pruning of a tree is necessary; and related techniques.

Solution to Problem

A free-space optical communication apparatus control apparatus in accordance with an example aspect of the present disclosure is a free-space optical communication apparatus control apparatus for controlling a free-space optical communication apparatus, and includes a detecting section for detecting an impediment to laser communication of the free-space optical communication apparatus; and a judging section for judging, in accordance with a state of the impediment to the laser communication, whether pruning of a tree is necessary.

A free-space optical communication apparatus control system in accordance with an example aspect of the present disclosure is a free-space optical communication apparatus control system including a free-space optical communication apparatus and a free-space optical communication apparatus control apparatus for controlling the free-space optical communication apparatus, the free-space optical communication apparatus includes a communicating section for conducting laser communication, and the free-space optical communication apparatus control apparatus includes: a detecting section for detecting an impediment to the laser communication of the free-space optical communication apparatus; and a judging section for judging, in accordance with a state of the impediment to the laser communication, whether pruning of a tree is necessary.

A free-space optical communication apparatus control method in accordance with an example aspect of the present disclosure is a free-space optical communication apparatus control method for controlling a free-space optical communication apparatus, and includes: at least one processor detecting an impediment to laser communication of the free-space optical communication apparatus; and the at least one processor judging, in accordance with a state of the impediment to the laser communication, whether pruning of a tree is necessary.

Advantageous Effects of Invention

An example aspect of the present disclosure has an example advantage of being capable of providing: a free-space optical communication apparatus control apparatus capable of judging, at low cost and with high accuracy, whether pruning of a tree is necessary; and related techniques.

EXAMPLE EMBODIMENTS

Figure 1:
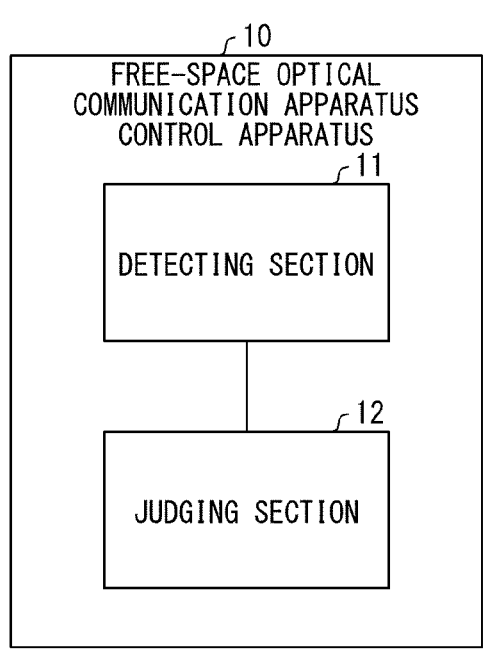
FIG. 1 is a block diagram illustrating a configuration of a free-space optical communication apparatus control apparatus in accordance with the present disclosure.

The example embodiments of the present invention will be exemplified in the following description. It should be noted that the present invention is not limited to the example embodiments described below, but may be altered in various ways by a skilled person within the scope of the claims. For example, any example embodiment derived by appropriately combining technical means employed in the example embodiments described below can also be within the scope of the present invention. Further, any example embodiment derived from appropriately omitting some of the technical means employed in the example embodiments described below can also be within the scope of the present invention. Furthermore, an example advantage to which reference is made in each of the example embodiments described below is an example of the advantage expected in that example embodiment, and does not define the extension of the present invention. Therefore, any example embodiment which does not provide the example advantage to which reference is made in each of the example embodiments described below can also be within the scope of the present invention.

Problem to be Solved by Example Embodiments

In the following description, a problem to be solved by the example embodiments will be described by taking a conventional technique as an example.

For example, in a case where there is a tree having been grown enough to hang over an electric wire, on a path of free-space optical communication (laser communication), which is wireless communication via laser light, i.e., on an optical path, the laser communication is impeded by the tree. This could make free-space optical communication impossible. As to the tree, when the tree is left unattended, without immediate pruning or cutting-down, the tree and the electric wire rub against each other, the protective covering of the electric wire tears and thus causes electrical leakage, and could further cause a power failure and a fire. Therefore, in order to detect and prune such a tree in advance, before a current leakage, a power failure, or the like is caused, there is demand for a technique of detecting a tree which could impede laser communication to judge whether pruning of the tree is necessary.

Conventionally, the judgment on whether pruning of a tree is necessary has been visually made by a pruner. Patent Literature 1 discloses a technique of applying laser light to judge, in accordance with the intensity of the reflected light, whether pruning of a tree is necessary.

However, the visual judgment on whether pruning of a tree is necessary causes an error resulting from manual judgment, makes it impossible to objectively and efficiently judge whether pruning of a tree is necessary, and entails personnel costs for a pruner's check, etc. Thus, in a case of visual judgment on whether pruning of a tree is necessary, it has been impossible to judge, at low cost and with high accuracy, whether pruning of a tree is necessary. In addition, the technique disclosed in Patent Literature 1 requires an additional apparatus for receiving reflected light to detect a tree which could impede laser communication, and it is therefore impossible to judge, at low cost, whether pruning of a tree is necessary.

Thus, an example object to be solved by the example embodiments is to provide: a free-space optical communication apparatus control apparatus capable of judging, at low cost and with high accuracy, whether pruning of a tree is necessary; and related techniques.

First Example Embodiment

The following description will discuss, in detail, a first example embodiment which is an example embodiment of the present invention, with reference to the drawings. The present example embodiment is basic to each of example embodiments which will be described later. It should be noted that the scope of application of each of the technical means used in the present example embodiment is not limited to the present example embodiment. Thus, each technical means used in the present example embodiment can be used in another example embodiment included in the present disclosure, to the extent that does not cause a special technical problem. Further, each technical means illustrated in the drawings that are referred to for describing the present example embodiment can also be used in another example embodiment included in the present disclosure, to the extent that does not cause a special technical problem.

(Configuration of Free-Space Optical Communication Apparatus Control Apparatus 10)

A configuration of a free-space optical communication apparatus control apparatus 10 in accordance with the present example embodiment will be described with reference to FIG. 1. FIG. 1 is a block diagram illustrating a configuration of the free-space optical communication apparatus control apparatus 10. The free-space optical communication apparatus control apparatus 10 controls a free-space optical communication apparatus which conducts laser communication. Specifically, the free-space optical communication apparatus control apparatus 10 judges whether pruning of a tree is necessary, in accordance with the state of an impediment to laser communication of the free-space optical communication apparatus. The free-space optical communication apparatus control apparatus 10 includes a detecting section (detecting means) 11 and a judging section (judging means) 12, as illustrated in FIG. 1. The detecting section 11 detects an impediment to laser communication of a free-space optical communication apparatus. The judging section 12 judges whether pruning of the tree is necessary, in accordance with the state of an impediment to the laser communication.

(Flow of Free-Space Optical Communication Apparatus Control Method S1)

Figure 2:
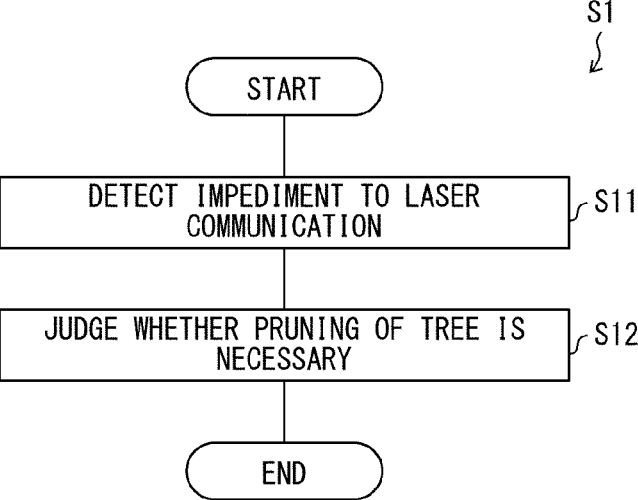
FIG. 2 is a flowchart illustrating a flow of a free-space optical communication apparatus control method in accordance with the present disclosure.

A flow of a free-space optical communication apparatus control method S1 in accordance with the present example embodiment will be described with reference to FIG. 2. FIG. 2 is a flowchart illustrating a flow of the free-space optical communication apparatus control method S1.

As illustrated in FIG. 2, the free-space optical communication apparatus control method S1 is a free-space optical communication apparatus control method for controlling a free-space optical communication apparatus, and includes step S11 and step S12. In the following description, the free-space optical communication apparatus control method S1 will be discussed by taking, an example, a case where the free-space optical communication apparatus control method S1 is carried out by the sections of the free-space optical communication apparatus control apparatus 10. However, the free-space optical communication apparatus control method S1 may be carried out by at least one processor. The at least one processor may be included in the free-space optical communication apparatus control apparatus 10, may be included in another apparatus, or may be included in a plurality of apparatuses.

(Step S11)

In step S11, the detecting section 11 of the free-space optical communication apparatus control apparatus 10 detects an impediment to laser communication of a free-space optical communication apparatus. For example, in a case where a failure (error) has occurred in laser communication of the free-space optical communication apparatus, the detecting section 11 may detect an impediment to the laser communication of the free-space optical communication apparatus.

(Step S12)

In step S12, the judging section 12 of the free-space optical communication apparatus control apparatus 10 judges whether pruning of a tree is necessary, in accordance with the state of the impediment to the laser communication. For example, the judging section 12 judges that the tree should be pruned, in a case where the degree of the state of the impediment is equal to or higher than a predetermined degree, and judges that the tree should not be pruned, in a case where the degree of the state of the impediment is lower than the predetermined degree. A degree "equal to or greater than a predetermined degree" is not particularly limited, provided that the degree is higher than a reference (degree) with respect to which the detecting section 11 detects an impediment to laser communication of a free-space optical communication apparatus, i.e., the degree at which a failure (error) occurs in the laser communication of the free-space optical communication apparatus.

(Free-Space Optical Communication Apparatus Control Program)

In a case where the free-space optical communication apparatus control apparatus 10 is provided by a computer, the functions of the free-space optical communication apparatus control apparatus 10 can be implemented by the following free-space optical communication apparatus control program stored in a memory referred to by the computer.

The free-space optical communication apparatus control program is a free-space optical communication apparatus control program for controlling a free-space optical communication apparatus, and causes a computer to function as: a detecting section 11 for detecting an impediment to laser communication of the free-space optical communication apparatus; and a judging section 12 for judging, in accordance with the state of the impediment to the laser communication, whether pruning of a tree is necessary.

Example Advantage of First Example Embodiment

A configuration employed in the present example embodiment is such that the detecting section 11 detects an impediment to laser communication of a free-space optical communication apparatus, and the judging section 12 judges, in accordance with the state of the impediment to laser communication, whether pruning of a tree is necessary.

With this configuration, it is possible to judge whether pruning of a tree is necessary, without relying on a visual check, without the need for an additional apparatus, and at low cost. In addition, since the judgment that a tree should be pruned is not made in a case of detection of an impediment to laser communication alone, but the judgment on whether pruning of a tree is necessary is made in accordance with the state of the impediment to the laser communication in addition to the detection of the impediment, it is possible to make a judgment with such high accuracy that only the tree that impedes communication is pruned. Therefore, with the present example embodiment, it is possible to provide: a free-space optical communication apparatus control apparatus capable of judging, at low cost and with high accuracy, whether pruning of a tree is necessary; and related techniques.

Second Example Embodiment

The following description will discuss, in detail, a second example embodiment which is an example embodiment of the present invention, with reference to the drawings. A component that has the same function as a component described in the example embodiment above is assigned the same reference sign, and the description thereof is omitted where appropriate. It should be noted that the scope of application of each of the technical means used in the present example embodiment is not limited to the present example embodiment. Thus, each technical means used in the present example embodiment can be used in another example embodiment included in the present disclosure, to the extent that does not cause a special technical problem. Further, each of the technical means illustrated in each drawing that is referred to for describing the present example embodiment can be used in another example embodiment included in the present disclosure, to the extent that does not cause a special technical problem.

The second example embodiment of the present disclosure will be described in detail with reference to the drawings. A component that has the same function as a component described in the first example embodiment is assigned the same reference sign, and the description thereof is omitted where appropriate.

(Configuration of Free-Space Optical Communication Apparatus Control System 1X)

Figure 3:
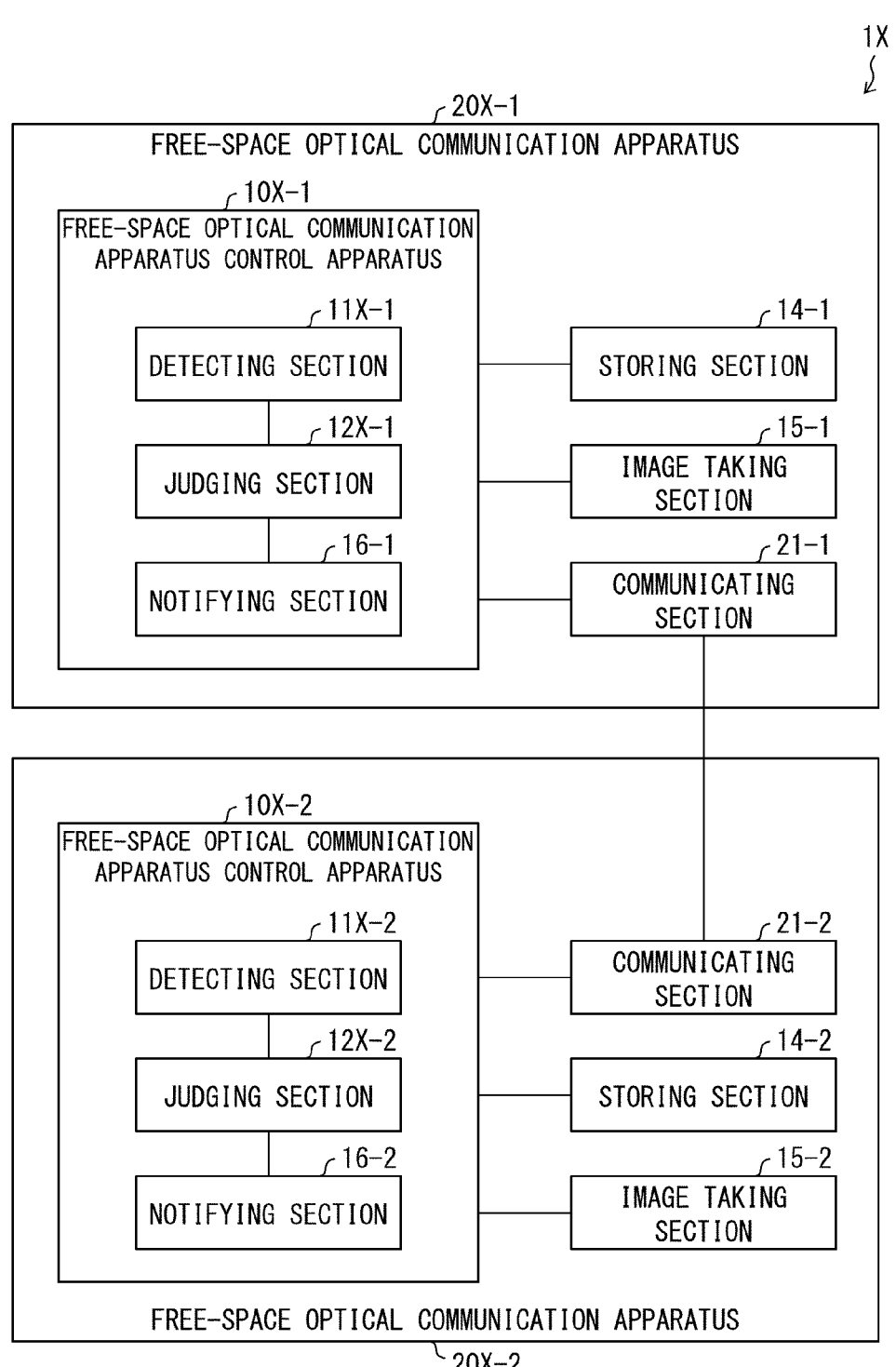
FIG. 3 is a block diagram illustrating a configuration of a free-space optical communication apparatus control system in accordance with the present disclosure.

A configuration of a free-space optical communication apparatus control system 1X in accordance with the present example embodiment will be described with reference to FIG. 3. FIG. 3 is a block diagram illustrating a configuration of the free-space optical communication apparatus control system 1x. The free-space optical communication apparatus control system 1X controls free-space optical communication apparatuses 20X-1 and 20X-2 which conduct laser communication. Specifically, the free-space optical communication apparatus control system 1x judges whether pruning of a tree is necessary, in accordance with the state of an impediment to the laser communication of the free-space optical communication apparatuses 20X-1 and 20X-2. The free-space optical communication apparatus control system 1x includes the free-space optical communication apparatuses 20X-1 and 20X-2 and free-space optical communication apparatus control apparatuses 10X-1 and 10X-2, as illustrated in FIG. 3.

Although the free-space optical communication apparatus control system 1x includes two free-space optical communication apparatuses which are the free-space optical communication apparatuses 20X-1 and 20X-2 in the example illustrated in FIG. 3, the free-space optical communication apparatus control system 1x only needs to include at least one free-space optical communication apparatus. Further, although the free-space optical communication apparatus 20X-1 includes the free-space optical communication apparatus control apparatus 10X-1 and the free-space optical communication apparatus 20X-2 includes the free-space optical communication apparatus control apparatus 10X-2, the present example embodiment is not limited to this configuration. The example illustrated in FIG. 3 has such a configuration in order for the free-space optical communication apparatus control apparatuses to control these free-space optical communication apparatuses with high accuracy. However, a configuration of the present example embodiment may be such that the number of free-space optical communication apparatus control apparatuses may be one for cost reduction. As used herein, the phrase "the free-space optical communication apparatus control apparatuses control these free-space optical communication apparatuses with high accuracy" means, for example, the capability of judging that a tree of high priority should be pruned, such as, for example, pruning of a tree which is judged, by both of free-space optical communication apparatus control apparatuses, as needing to be pruned. Further, these free-space optical communication apparatus control apparatuses may be externally attached to these free-space optical communication apparatuses. This means that the free-space optical communication apparatus control apparatuses 10X-1 and 10X-2 may externally control the free-space optical communication apparatuses 20X-1 and 20X-2. The free-space optical communication apparatuses 20X-1 and 20X-2 illustrated in FIG. 3 have the same configuration. Accordingly, the following description will be centered on one free-space optical communication apparatus which is the free-space optical communication apparatus 20X-1, and the description of the free-space optical communication apparatus 20X-2 will be omitted where appropriate.

(Free-Space Optical Communication Apparatus 20X-1)

The free-space optical communication apparatus 20X-1 includes the free-space optical communication apparatus control apparatus 10X-1, a storing section (storing means) 14-1, an image taking section (image taking means) 15-1, and a communicating section (communicating means) 21-1.

The free-space optical communication apparatus control apparatus 10X-1 controls the free-space optical communication apparatus 20X-1. Specifically, the free-space optical communication apparatus control apparatus 10X-1 judges whether pruning of a tree is necessary, in accordance with the state of an impediment to laser communication of the free-space optical communication apparatus 20X-1. The free-space optical communication apparatus control apparatus 10X-1 includes a detecting section 11X-1, a judging section 12X-1, and a notifying section (notifying means) 16-1, as illustrated in FIG. 3.

The detecting section 11X-1 detects an impediment to laser communication of the free-space optical communication apparatus 20X-1. The judging section 12X-1 judges, in accordance with the state of the impediment to the laser communication, whether pruning of the tree is necessary. Specifically, the judging section 12X-1 judges whether pruning of a tree is necessary, in accordance with at least one selected from the group consisting of the period of the impediment to communication, which represents the "state of the impediment to laser communication", and image information. The notifying section 16-1 notifies the result of judgment made by the judging section 12X-1. The storing section 14-1 stores various kinds of data such as the above-described period and image information. The image taking section 15-1 acquires image information by taking an image on an optical path. The communicating section 21-1 conducts laser communication by sending and receiving laser light to and from the free-space optical communication apparatus 20X-2. Although the notifying section 16-1 is included in the free-space optical communication apparatus control apparatus 10X-1 in the example illustrated in FIG. 3, the notifying section 16-1 only needs to be included in the free-space optical communication apparatus 20X-1. The notifying section 16-1 may be externally attached to the free-space optical communication apparatus control apparatus 10X-1.

(Flow of Free-Space Optical Communication Apparatus Control Method S1X)

Figure 4:
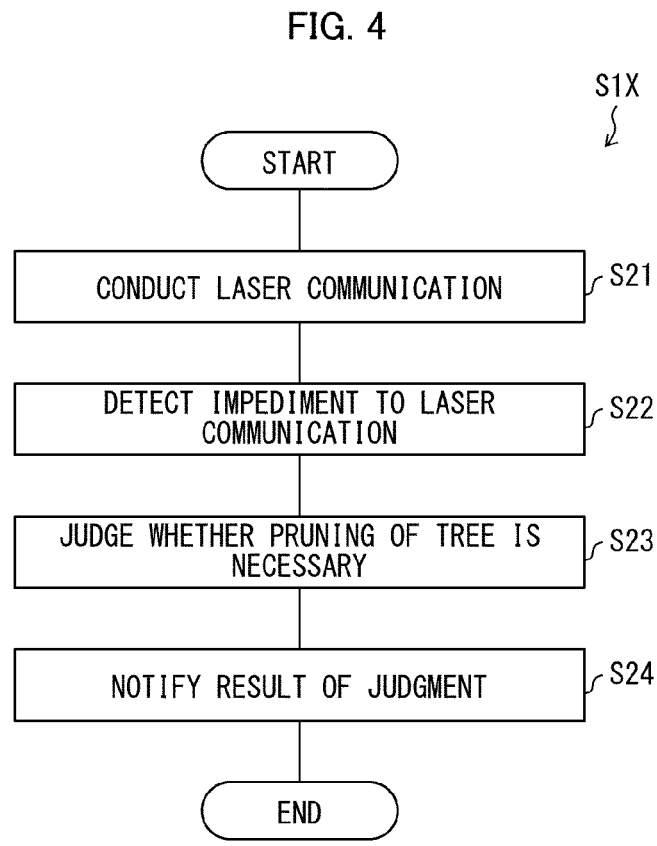
FIG. 4 is a flowchart illustrating a flow of a free-space optical communication apparatus control method in accordance with the present disclosure.

A flow of a free-space optical communication apparatus control method S1X in accordance with the present example embodiment will be described with reference to FIG. 4. FIG. 4 is a flowchart illustrating a flow of the free-space optical communication apparatus control method S1X.

The free-space optical communication apparatus control method S1X includes steps S21, S22, S23, and S24, as illustrated in FIG. 4. Step S22 is the same as step S11 of the first example embodiment.

In the following description, the discussion of the free-space optical communication apparatus control method S1X is centered on a case where the free-space optical communication apparatus control method S1X is carried out by the sections of the free-space optical communication apparatus 20X-1 of the free-space optical communication apparatus control system 1x. However, the free-space optical communication apparatus control method S1X may be carried out the sections of the free-space optical communication apparatus 20X-2, or may be carried out by at least one processor. The at least one processor may be included in the free-space optical communication apparatus 20X-1, may be included in another apparatus, such as the free-space optical communication apparatus 20X-2, or may be included in a plurality of apparatuses.

(Step S21)

The communicating section 21-1 of the free-space optical communication apparatus 20X-1 of the free-space optical communication apparatus control system 1X conducts laser communication with the free-space optical communication apparatus 20X-2. For example, in a case where the free-space optical communication apparatus 20X-2 is a light sender-side apparatus, laser light is sent from the communicating section 21-2 of the free-space optical communication apparatus 20X-2 and the communicating section 21-1 of the free-space optical communication apparatus 20X-1 receives the laser light, so that communication is conducted.

(Step S23)

The judging section 12X-1 of the free-space optical communication apparatus 20X-1 of the free-space optical communication apparatus control system 1x judges whether pruning of a tree is necessary, in accordance with at least one selected from the group consisting of the period of the impediment to the laser communication and image information indicating the state of the impediment to the laser communication.

For example, in a case where the period of the impediment to the laser communication is equal to or longer than a first predetermined period, the judging section 12X-1 may judge that pruning of a tree is necessary. Examples of the "first predetermined period" include 2 seconds.

In a case where at least a part of a tree is imaged in a proportion equal to or greater than a predetermined proportion in a predetermined area of the image information, the judging section 12X-1 may judge that pruning of a tree is necessary. In this case, for example, the image taking section 15-1 may be disposed at a position which is as high as the communicating section 21-1, which sends and receives laser light, and at which the central axis of the laser light that follows a communication path falls at the center of a lens. Further, in a case where laser communication has been impeded for a period equal to or longer than the first predetermined period, the image taking section 15-1 may acquire still image information. Furthermore, in a case where the laser light following a communication path passes through a central area of the image information, the "predetermined area" means an area containing the central area. Examples of such a "predetermined area" include a circular area within a predetermined range from the center of the image information, and exclude an area through which laser light following the communication path does not pass, such as an edge portion of the image information. The "predetermined proportion" means a proportion or the like which results in occurrence of a communication error and an impediment to the communication due to, for example, the image of a tree occupying most of the central area of the image information, and is not particularly limited provided that the proportion brings about such a state.

In a case where the period of the impediment to laser communication is equal to or longer than the first predetermined period and at least a part of the tree is imaged in a proportion equal to or greater than the predetermined proportion in the predetermined area of the image information, the judging section 12X-1 may judge that pruning of the tree is necessary. In this case, after a judgment that pruning of the tree is not necessary is made and in a case where the lapse of the period of the impediment to the laser communication is equal to or longer than the second predetermined period, the judging section 12X-1 may further judge, in accordance with moving image information included in the image information, whether pruning of the tree is necessary. The "second predetermined period" is not particularly limited provided that the period is longer than the first predetermined period and is enough for a change in state from the state in which pruning of a tree is not necessary to the state in which pruning of the tree is necessary.

In addition, in the above example, the judging section 12X-1 judges whether pruning of a tree is necessary, in accordance with the state of the impediment to communication conducted by the communicating section 21-1, under the situation where the image taking section 15-1 is disposed at a position which is as high as laser light and at which the central axis of the laser light that follows the communication path falls at the center of a lens. However, the configuration is not limited to such a configuration, in a case where the free-space optical communication apparatus 20X-1 includes a communicating section (vacant channel) which is capable of sending and receiving laser light and which is not in use for communication, in addition to the communicating section 21-1, which conducts communication by sending and receiving laser light. In this case, the judging section 12X-1 may judge whether pruning of a tree is necessary, at a height different from the height of the laser light used for communication and in accordance with the state of an impediment to laser communication conducted via the laser light sent and received to and from a vacant channel. Further, in this case, the image taking section 15-1 may take, at a height different from the height of laser light following an optical path, an image of a path following the optical path, and the judging section 12X-1 may regard, as the predetermined area, an area different from the above-described central area of the image information, to judge whether pruning of a tree is necessary.

(Step S24)

The notifying section 16-1 of the free-space optical communication apparatus 20X-1 of the free-space optical communication apparatus control system 1x notifies the result of judgment made by the judging section 12X-1. For example, in a case where the judging section 12X-1 has judged that pruning of a tree is necessary, the notifying section 16-1 notifies a user that pruning of the tree is necessary. In a case where the judging section 12X-1 has judged that pruning of the tree is not necessary, the notifying section 16-1 notifies the user that pruning of the tree is not necessary. Means for notification made by the notifying section 16-1 is not particularly limited. Examples of the means may include a notification by a sound and an indication by an image.

Example Advantage of Second Example Embodiment

As above, a configuration employed in the free-space optical communication apparatus control system 1x in accordance with the second example embodiment is such that the free-space optical communication apparatus 20X-1 and the free-space optical communication apparatus control apparatus 10X-1 are included, and the communicating section 21-1 conducts laser communication, the detecting section 11X-1 detects an impediment to the laser communication of the free-space optical communication apparatus 20X-1, and the judging section 12X-1 judges, in accordance with the state of the impediment to the laser communication, whether pruning of a tree is necessary.

With this configuration, it is possible to judge whether pruning of a tree is necessary, without relying on a visual check, without the need for an additional apparatus, and at low cost. In addition, since the judgment that a tree should be pruned is not made in a case of detection of an impediment to laser communication alone, but the judgment on whether pruning of a tree is necessary is made in accordance with the state of the impediment to the laser communication in addition to the detection of the impediment, it is possible to make a judgment with such high accuracy that only the tree that impedes communication is pruned. Thus, the present example embodiment provides an example advantage of being capable of judging whether pruning of a tree is necessary, at low cost and with high accuracy.

A configuration employed in the present example embodiment is such that a notifying section 16-1 for notifying the result of judgment made by the judging section 12X-1 is included. With this configuration, it is possible to automatically notify a remote user of the result of judgment. Thus, the present example embodiment provides, in addition to the example advantage provided by the first example embodiment, an example advantage of being capable of easily understand whether pruning of a tree is necessary without the user going to the site in which the impediment to laser communication has occurred.

A configuration employed in the present example embodiment is such that the judging section 12X-1 judges, in accordance with at least one selected from the group consisting of the period of an impediment to laser communication and image information indicating the state of the impediment to the laser communication, whether pruning of a tree is necessary. With this configuration, it is possible to judge, with higher accuracy, whether the cause of the impediment to laser communication is a tree. Thus, the present example embodiment provides, in addition to the example advantage provided by the first example embodiment, an example advantage of being capable of judging, with higher accuracy, whether pruning of a tree is necessary.

A configuration employed in the present example embodiment is such that the judging section 12X-1 judges that pruning of a tree is necessary, in a case where the period of an impediment to laser communication is equal to or longer than the first predetermined period. With this configuration, it is possible to judge, with higher accuracy, whether the cause of the impediment to laser communication is a tree. Thus, the present example embodiment provides, in addition to the example advantage provided by the first example embodiment, an example advantage of being capable of judging, with higher accuracy, whether pruning of a tree is necessary.

A configuration employed in the present example embodiment is such that the judging section 12X-1 judges that pruning of a tree is necessary, in a case where a tree is imaged in a proportion equal to or greater than a predetermined proportion in a predetermined area of the image information. With this configuration, it is possible to judge, with higher accuracy, whether the cause of the impediment to laser communication is a tree. Thus, the present example embodiment provides, in addition to the example advantage provided by the first example embodiment, an example advantage of being capable of judging, with higher accuracy, whether pruning of a tree is necessary.

A configuration employed in the present example embodiment is such that in a case where the period of the impediment to the laser communication is equal to or longer than the second predetermined period, the judging means judges, in accordance with moving image information included in the image information, whether pruning of a tree is necessary. With this configuration, it is possible to judge whether pruning of a tree is necessary, in accordance with still image information, which is inexpensive, until the second predetermined period has lapsed, and judge whether pruning of a tree is necessary, in accordance with moving image information, which is highly accurate, only in a case where the second predetermined period has lapsed. Thus, the present example embodiment provides, in addition to the example advantage provided by the first example embodiment, an example advantage of being capable of judging, even at low cost and with high accuracy, whether pruning of a tree is necessary.

Third Example Embodiment

The following description will discuss, in detail, a third example embodiment which is an example embodiment of the present invention, with reference to the drawings. A component that has the same function as a component described in the example embodiments above is assigned the same reference sign, and the description thereof is omitted where appropriate. It should be noted that the scope of application of each of the technical means used in the present example embodiment is not limited to the present example embodiment. Thus, each technical means used in the present example embodiment can be used in another example embodiment included in the present disclosure, to the extent that does not cause a special technical problem. Further, each of the technical means illustrated in each drawing that is referred to for describing the present example embodiment can be used in another example embodiment included in the present disclosure, to the extent that does not cause a special technical problem.

(Configuration of Free-Space Optical Communication Apparatus Control System 1Y)

Figure 5:
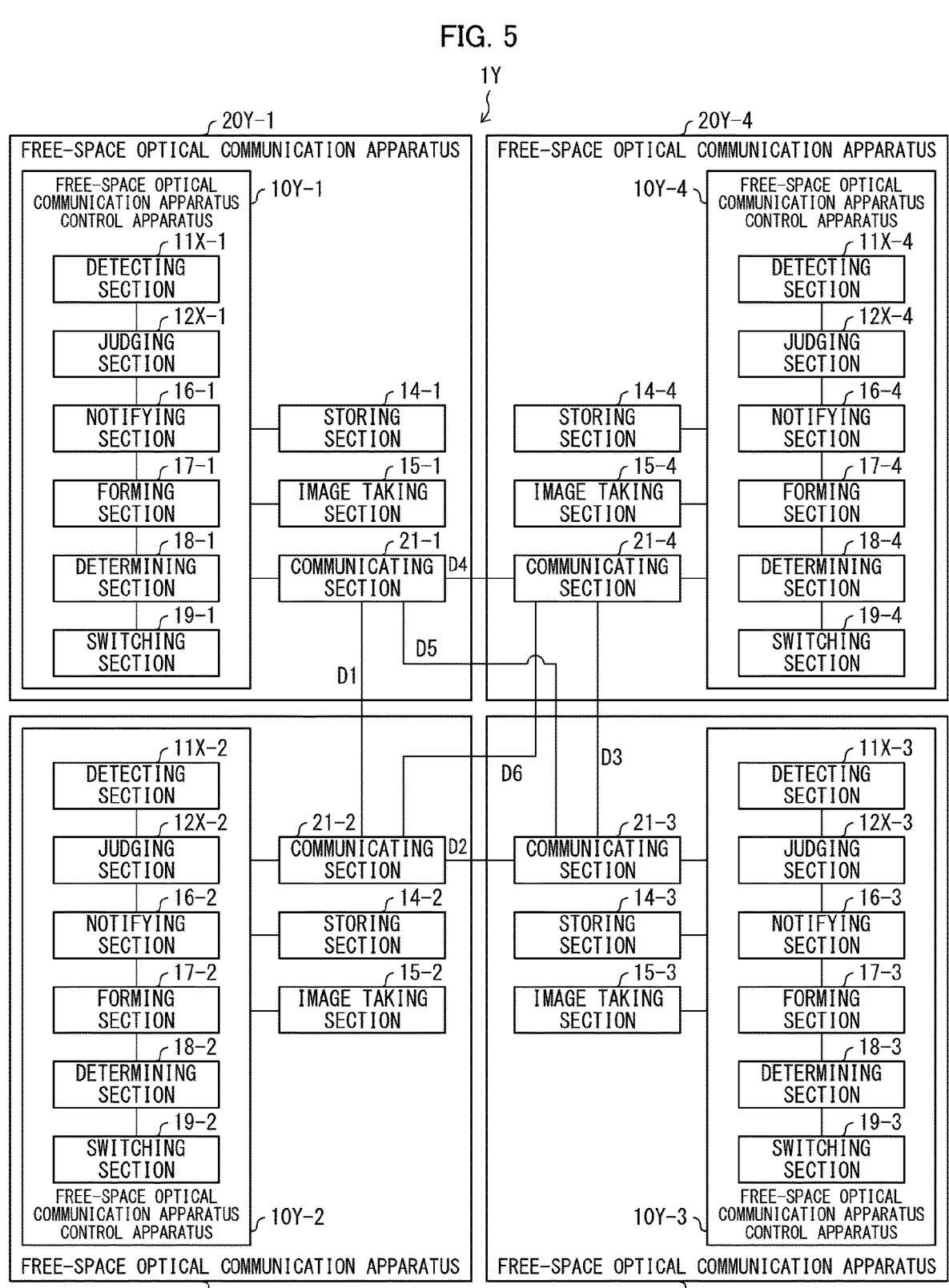
FIG. 5 is a block diagram illustrating a configuration of a free-space optical communication apparatus control system in accordance with the present disclosure.

A configuration of a free-space optical communication apparatus control system 1Y in accordance with the present example embodiment will be described with reference to FIG. 5. FIG. 5 is a block diagram of a configuration of the free-space optical communication apparatus control system 1Y. The free-space optical communication apparatus control system 1Y includes free-space optical communication apparatuses 20Y-1 to 20Y-4, as illustrated in FIG. 5. Although the free-space optical communication apparatus control system 1Y includes four free-space optical communication apparatuses 20Y-1 to 20Y-4 in the example illustrated in FIG. 5, the free-space optical communication apparatus control system 1Y only needs to include a plurality of free-space optical communication apparatuses, and the number of the plurality of free-space optical communication apparatuses is not particularly limited. The free-space optical communication apparatuses 20Y-1 to 20Y-4 illustrated in FIG. 5 have the same configuration. Accordingly, the following description will be centered on one free-space optical communication apparatus which is the free-space optical communication apparatus 20Y-1, and the description of the free-space optical communication apparatuses 20Y-2 to 20Y-4 will be omitted where appropriate.

(Configuration of Free-Space Optical Communication Apparatus 20Y-1)

The free-space optical communication apparatus 20Y-1 includes a free-space optical communication apparatus control apparatus 10Y-1 instead of the free-space optical communication apparatus control apparatus 10X-1 in the second example embodiment. The free-space optical communication apparatus control apparatus 10Y-1 further includes a forming section (forming means) 17-1, a determining section (determining means) 18-1, and a switching section (switching means) 19-1. Except these respects, the free-space optical communication apparatus 20Y-1 has the same configuration as the free-space optical communication apparatus 20X-1 in the second example embodiment.

(Forming Section 17-1)

Figure 7:
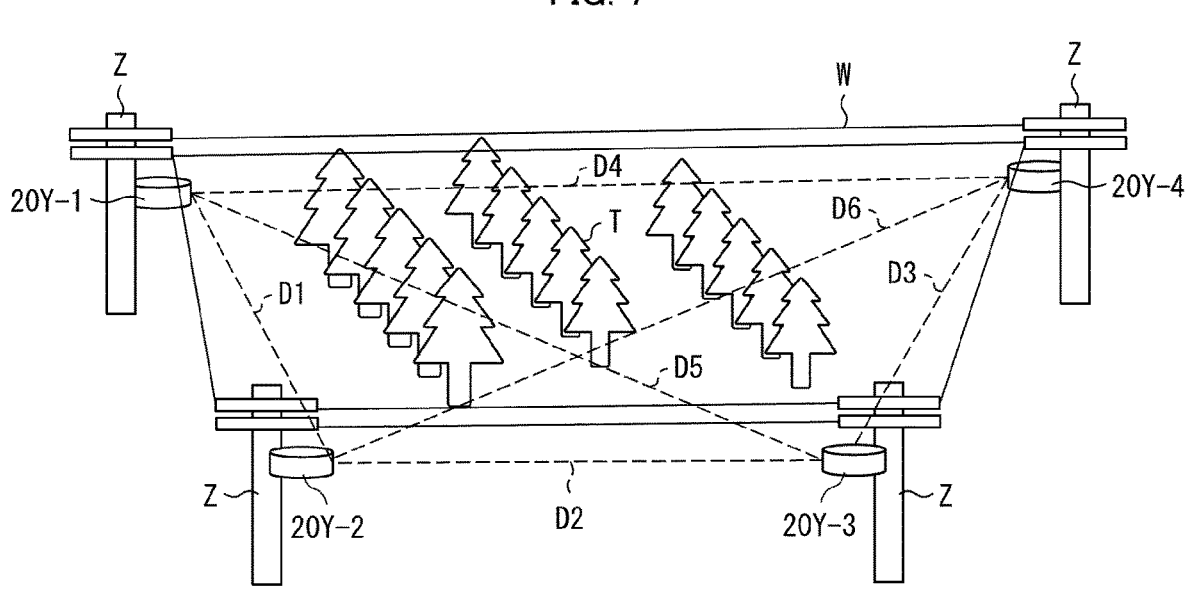
FIG. 7 is a diagram illustrating an example of connection paths in a meshed form.

The forming section 17-1 forms connection paths D1 to D6 in a meshed form by forming one or more connection paths D1 to D6 each connecting free-space optical communication apparatuses to each other, among the plurality of free-space optical communication apparatuses 20Y-1 to 20Y-4 including the free-space optical communication apparatus 20Y-1, the one or more connection paths including the path of current laser communication. The connection paths D1 to D6 in a meshed form means connection paths which are established so as to form a mesh and which is provided with redundancy, such that, for example, connection paths D5 and D6 are diagonally formed as illustrated in FIG. 5 and FIG. 7, which will be described later.

(Determining Section 18-1)

The determining section 18-1 determines, in accordance with the state of an impediment to laser communication, alternative paths which are selected from among the connection paths D1 to D6 and to which the path of the current laser communication is to be switched.

(Switching Section 19-1)

The switching section 19-1 switches the path of the current laser communication to the alternative paths determined by the determining section 18-1.

(Flow of Free-Space Optical Communication Apparatus Control Method S1Y)

Figure 6:
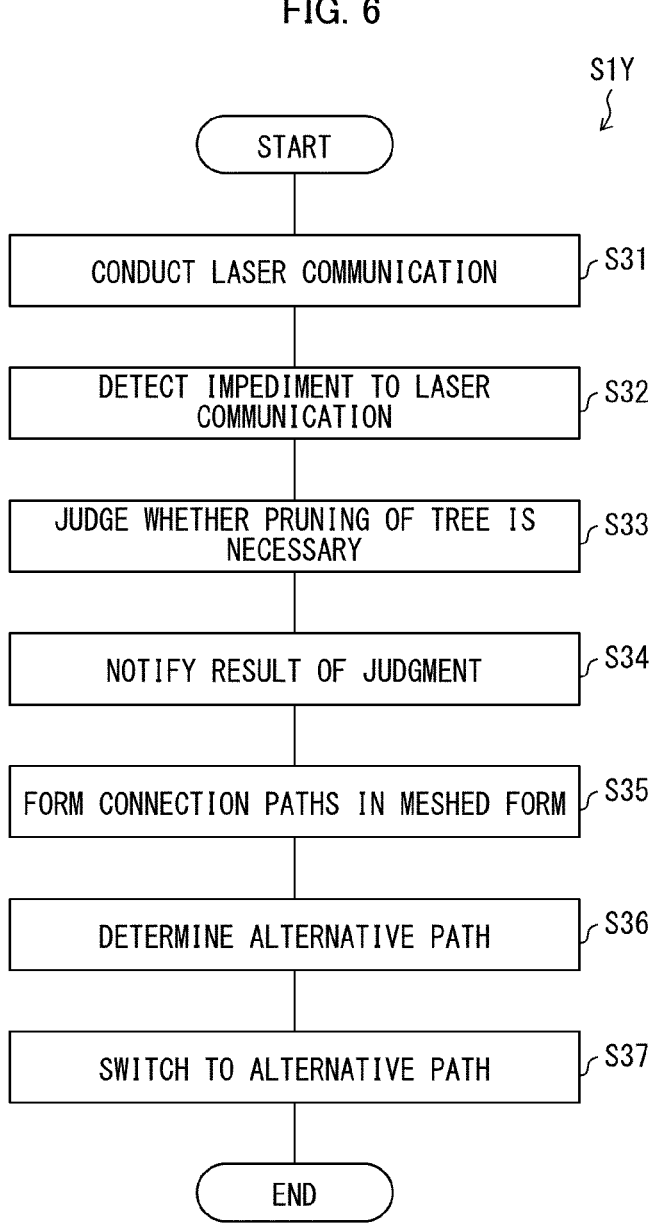
FIG. 6 is a flowchart illustrating a flow of a free-space optical communication apparatus control method in accordance with the present disclosure.

A flow of a free-space optical communication apparatus control method S1Y in accordance with the present example embodiment will be described with reference to FIG. 6. FIG. 6 is a flowchart illustrating a flow of the free-space optical communication apparatus control method S1Y.

The free-space optical communication apparatus control method S1Y includes steps S31, S32, S33, S34, S35, S36, and S37, as illustrated in FIG. 6. Steps S31 to S34 are the same as steps S21 to S24 in the second example embodiment.

In the following description, the discussion of the free-space optical communication apparatus control method S1Y is centered on a case where the free-space optical communication apparatus control method S1Y is carried out by the sections of the free-space optical communication apparatus 20Y-1. However, the free-space optical communication apparatus control method S1Y may be carried out by the sections of each of the free-space optical communication apparatuses 20Y-2 to 20Y-4, or may be carried out by at least one processor. The at least one processor may be included in the free-space optical communication apparatuses 20Y-1 to 20Y-4, may be included in another apparatus, or may be included in a plurality of apparatuses.
(Step S35)

In step S35, the forming section 17-1 forms the connection paths D1 to D6 in a meshed form by forming one or more connection paths D1 to D6 each connecting free-space optical communication apparatuses to each other, among the plurality of free-space optical communication apparatuses 20Y-1 to 20Y-4, the one or more connection paths including the path of the current laser communication.

Example of Step S35

An example of step S35 will be described below, with use of FIG. 7. FIG. 7 is a diagram illustrating an example of the free-space optical communication apparatus control system 1Y. In the example illustrated in FIG. 7, the free-space optical communication apparatuses 20Y-1 to 20Y-4 are installed at a plurality of respective power poles P. The plurality of power poles P are connected together by a plurality of electric wires W. In this case, the forming sections 17-1 to 17-4 form the connection paths D1 to D6, established so as to form a mesh to be in a meshed form, by forming one or more connection paths D1 to D6 each connecting free-space optical communication apparatuses to each other, the one or more connection paths including the connection paths D5 and D6 diagonally formed.
(Step S36)

In step S36, the determining section 18-1 determines, in accordance with the state of an impediment to laser communication, alternative paths which are selected from among the connection paths D1 to D6 except the path of the current laser communication and to which the current laser communication is to be switched.

Example of Step S36

An example of step S36 will be described below, with use of FIG. 7. Discussed in this description is a case where the path of the current laser communication is the connection path D4, and the detecting section 11X-1 has detected an impediment to the communication conducted between the free-space optical communication apparatuses 20Y-1 and 20Y-4. The determining section 18-1 determines, in accordance with the state of the impediment to the laser communication, alternative paths which are selected from among the connection paths D1 to D3, D5, and D6, which are not the connection path D4, and to which the path of the current laser communication conducted between the plurality of free-space optical communication apparatuses 20Y-1 and 20Y-4 is to be switched. For example, the determining section 18-1 may determine alternative paths to which the path of the laser communication is to be switched, the alternative paths being the connection paths D5 and D3, which constitute the shortest length of the path of communication conducted between the free-space optical communication apparatuses 20Y-1 and 20Y-4, except the connection path D4. The determining section 18-1 may determine alternative paths, in accordance with the status of communication conducted between a plurality of free-space optical communication apparatuses, such as communication speed, an impediment to communication, or the capacity of communication, instead of or in addition to the length of the path of communication conducted between the free-space optical communication apparatuses.
(Step S37)

In step S37, the switching section 19-1 switches the path of the laser communication, having been impeded, of the free-space optical communication apparatuses, to the alternative paths determined by the determining section 18-1.

Example of Step S37

An example of step S37 will be described below, with use of FIG. 7. For example, in a case where the determining section 18-1 determines that alternative paths to the connection path D4 of the laser communication conducted between the free-space optical communication apparatuses 20Y-1 and 20Y-4 are the connection paths D5 and D3, the switching section 19-1 switches the connection path D4 to the connection paths D5 and D3.

Example Advantage of Third Example Embodiment

A configuration employed in the free-space optical communication apparatus control system 1Y in accordance with the present example embodiment is such that the forming section 17-1 forms connection paths D1 to D6 in a meshed form by forming one or more connection paths D1 to D6 each connecting free-space optical communication apparatuses to each other, among the plurality of free-space optical communication apparatuses 20Y-1 to 20Y-4, the one or more connection paths including the path of the current laser communication, and the determining section 18-1 determines, in accordance with the state of the impediment to the laser communication, alternative paths which are selected from among the connection paths D1 to D6 except the path of the current laser communication and to which the path of the current laser communication is to be switched.

With this configuration, it is possible to switch the path of current communication to alternative paths which are selected from among the connection paths D1 to D6 established so as to form a mesh and in which no impediment to communication has occurred, even in a case where an impediment to laser communication has occurred in the path of the current laser communication. Thus, the present example embodiment provides an example advantage, in addition to the example advantage provided by the first example embodiment, an example advantage of being capable of maintaining laser communication in a network as a whole, even in a case where an impediment to laser communication occurs in a part of the network.
[Software Implementation Example]

Some or all of the functions of each of the apparatuses that constitute the free-space optical communication apparatus control apparatuses 10, 10X-1, 10X-2, and 10Y-1 to 10Y-4 may be implemented by hardware such as an integrated circuit (IC chip), or may be implemented by software.

Figure 8:
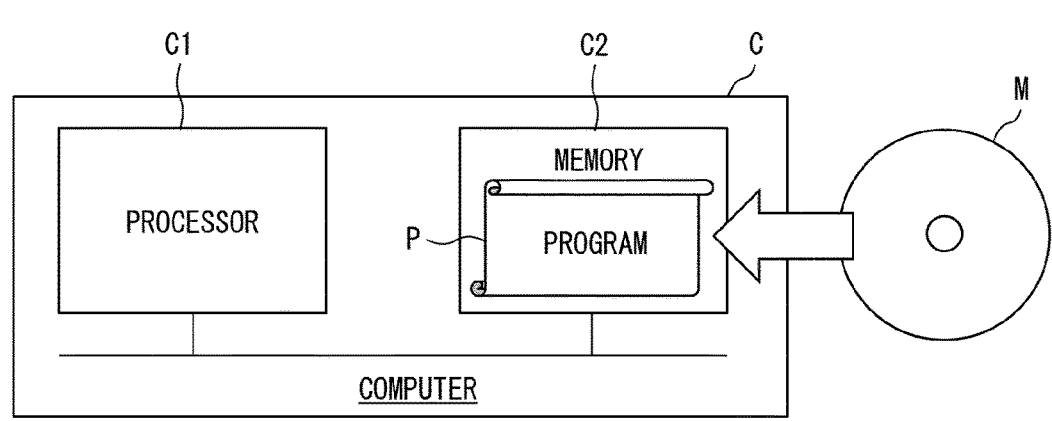
FIG. 8 is a diagram illustrating an example of a computer which executes the instructions of a program which is software for implementing the functions of each of the apparatuses in accordance with each of the example embodiments.

In the latter case, each of the apparatuses that constitute the free-space optical communication apparatus control apparatuses 10, 10X-1, 10X-2, and 10Y-1 to 10Y-4 is provided by, for example, a computer that executes instructions of a program that is software implementing the foregoing functions. An example (hereinafter, computer C) of such a computer is illustrated in FIG. 8. The computer C includes at least one processor C1 and at least one memory C2. The memory C2 has stored therein a program P for causing the computer C to operate as each of the apparatuses that constitute the free-space optical communication apparatus control apparatuses 10, 10X-1, 10X-2, and 10Y-1 to 10Y-4. The processor C1 of the computer C retrieves the program P from the memory C2 and executes the program P, so that the functions of each of the apparatuses that constitute the free-space optical communication apparatus control apparatuses 10, 10X-1, 10X-2, and 10Y-1 to 10Y-4 are implemented.

As the processor C1, a central processing unit (CPU) can be used, for example. As the memory C2, a "non-transitory, tangible medium" can be used. Examples of the non-transitory, tangible medium include not only a read only memory (ROM) or the like but also a tape, a disk, a card, a semiconductor memory, a programmable logic circuit, or the like. Further, the computer C may further include a random access memory (RAM) or the like into which the program is loaded. Further, the program may be supplied to or made available to the computer via any transmission medium (such as a communication network or a broadcast wave) which allows the program to be transmitted. An example aspect of the present disclosure can also be implemented in the form of a data signal in which the program is embodied via electronic transmission and which is embedded in a carrier wave.

[Additional Remark 1]

The techniques described in the supplementary notes below are within the scope of the present disclosure. It should be noted that the present invention is not limited to the supplementary notes described below, but may be altered in various ways by a skilled person within the scope of the claims. The whole or part of the example embodiments disclosed above can be described as, but not limited to, the following supplementary notes.

(Supplementary Note 1)

A free-space optical communication apparatus control apparatus for controlling a free-space optical communication apparatus, the free-space optical communication apparatus control apparatus including:

a detecting means for detecting an impediment to laser communication of the free-space optical communication apparatus; and a judging means for judging, in accordance with a state of the impediment to the laser communication, whether pruning of a tree is necessary.

(Supplementary Note 2)

The free-space optical communication apparatus control apparatus described in supplementary note 1, further including a notifying means for notifying a result of judgment made by the judging means.

(Supplementary Note 3)

The free-space optical communication apparatus control apparatus described supplementary note 1 or 2, in which the judging means is configured to judge, in accordance with at least one selected from the group consisting of a period of the impediment to the laser communication and image information indicating the state of the impediment to the laser communication, whether pruning of the tree is necessary.

(Supplementary Note 4)

The free-space optical communication apparatus control apparatus described in supplementary note 3, in which the judging means is configured to judge that pruning of the tree is necessary, in a case where the period of the impediment to the laser communication is equal to or longer than a first predetermined period.

(Supplementary Note 5)

The free-space optical communication apparatus control apparatus described in supplementary note 3 or 4, in which the judging means is configured to judge that pruning of the tree is necessary, in a case where the tree is imaged in a predetermined area of the image information, in a proportion equal to or greater than a predetermined proportion.

(Supplementary Note 6)

The free-space optical communication apparatus control apparatus described in supplementary note 5, in which the judging means is configured to judge, in accordance with moving image information included in the image information, whether pruning of the tree is necessary, in a case where the period of the impediment to the laser communication is equal to or longer than a second predetermined period.

(Supplementary Note 7)

The free-space optical communication apparatus control apparatus described in any one of supplementary notes 1 to 6, further including:

a forming means for forming connection paths in a meshed form by forming one or more connection paths each connecting free-space optical communication apparatuses to each other, among a plurality of free-space optical communication apparatuses including the free-space optical communication apparatus, the one or more connection paths including a path of the laser communication that is currently conducted; and a determining means for determining, in accordance with the state of the impediment to the laser communication, alternative paths which are selected from among the one or more connection paths except the path of the laser communication that is currently conducted and to which the path of the laser communication that is currently conducted is to be switched.

(Supplementary Note 8)

A free-space optical communication apparatus control system including a free-space optical communication apparatus and a free-space optical communication apparatus control apparatus for controlling the free-space optical communication apparatus, the free-space optical communication apparatus including a communicating means for conducting laser communication, the free-space optical communication apparatus control apparatus including:

a detecting means for detecting an impediment to the laser communication of the free-space optical communication apparatus; and a judging means for judging, in accordance with a state of the impediment to the laser communication, whether pruning of a tree is necessary.

(Supplementary Note 9)

A free-space optical communication apparatus control method for controlling a free-space optical communication apparatus, the free-space optical communication apparatus control method including:

at least one processor detecting an impediment to laser communication of the free-space optical communication apparatus; and the at least one processor judging, in accordance with a state of the impediment to the laser communication, whether pruning of a tree is necessary.

(Supplementary Note 10)

A free-space optical communication apparatus control program for controlling a free-space optical communication apparatus, the free-space optical communication apparatus control program causing a computer to function as:

a detecting means for detecting an impediment to laser communication of the free-space optical communication apparatus; and a judging means for judging, in accordance with a state of the impediment to the laser communication, whether pruning of a tree is necessary.

[Additional Remark 2]

A free-space optical communication apparatus control apparatus including at least one processor, the at least one processor carrying out: detecting an impediment to laser communication of a free-space optical communication apparatus; and judging, in accordance with a state of the impediment to the laser communication, whether pruning of a tree is necessary. It should be noted that this free-space optical communication apparatus control apparatus may further include a memory, and this memory may have stored therein a free-space optical communication apparatus control program for causing the at least one processor to carry out: detecting an impediment to laser communication of the free-space optical communication apparatus; and judging, in accordance with a state of the impediment to the laser communication, whether pruning of a tree is necessary. Furthermore, this free-space optical communication apparatus control program may be recorded on a computer-readable, non-transitory, and tangible recording medium.

[Additional Remark 3]

The present disclosure can provide: a free-space optical communication apparatus control apparatus capable of judging, at low cost and with high accuracy, whether pruning of a tree is necessary; and related techniques. Thus, the present disclosure contributes to the achievement of Goal 9 of the Sustainable Development Goals (SDGs) "industry, innovation and infrastructure".

REFERENCE SIGNS LIST 1x, 1Y: Free-space optical communication apparatus control system 10, 10X-1, 10X-2, 10Y-1, 10Y-2, 10Y-3, 10Y-4: Free-space optical communication apparatus control apparatus 11, 11X-1, 11X-2, 11X-3, 11X-4: Detecting section (detecting means)

12, 12X-1, 12X-2, 12X-3, 12X-4: Judging section (judging means)

16-1, 16-2, 16-3, 16-4: Notifying section (notifying means)

17-1, 17-2, 17-3, 17-4: Forming section (forming means)

18-1, 18-2, 18-3, 18-4: Determining section (determining means)

20X-1, 20X-2, 20Y-1, 20Y-2, 20Y-3, 20Y-4: Free-space optical communication apparatus 21-1, 21-2, 21-3, 21-4: Communicating section D1, D2, D3, D4, D5, D6: Connection path S1, S1X, S1Y: Free-space optical communication apparatus control method

The invention claimed is:

1. A free-space optical communication apparatus control apparatus for controlling a free-space optical communication apparatus, the free-space optical communication apparatus control apparatus comprising at least one processor, the at least one processor carrying out:

a detecting process of detecting an impediment to laser communication of the free-space optical communication apparatus; and a judging process of judging, in accordance with a state of the impediment to the laser communication, whether pruning of a tree is necessary.

2. The free-space optical communication apparatus control apparatus according to claim 1, wherein the at least one processor further carries out a notifying process of notifying a result of judgment made in the judging process.

3. The free-space optical communication apparatus control apparatus according to claim 1, wherein in the judging process, the at least one processor judges, in accordance with at least one selected from the group consisting of a period of the impediment to the laser communication and image information indicating the state of the impediment to the laser communication, whether pruning of the tree is necessary.

4. The free-space optical communication apparatus control apparatus according to claim 3, wherein in the judging process, the at least one processor judges that pruning of the tree is necessary, in a case where the period of the impediment to the laser communication is equal to or longer than a first predetermined period.

5. The free-space optical communication apparatus control apparatus according to claim 3, wherein in the judging process, the at least one processor judges that pruning of the tree is necessary, in a case where at least a part of the tree is imaged in a proportion equal to or greater than a predetermined proportion in a predetermined area of the image information.

6. The free-space optical communication apparatus control apparatus according to claim 5, wherein in the judging process, the at least one processor judges, in accordance with moving image information included in the image information, whether pruning of the tree is necessary, in a case where the period of the impediment to the laser communication is equal to or longer than a second predetermined period.

7. The free-space optical communication apparatus control apparatus according to claim 1, wherein the at least one processor further carries out:

a forming process of forming connection paths in a meshed form by forming one or more connection paths each connecting free-space optical communication apparatuses to each other, among a plurality of free-space optical communication apparatuses including the free-space optical communication apparatus, the one or more connection paths including a path of the laser communication that is currently conducted; and a determining process of determining, in accordance with the state of the impediment to the laser communication, alternative paths which are selected from among the one or more connection paths except the path of the laser communication that is currently conducted and to which the path of the laser communication that is currently conducted is to be switched.

8. A free-space optical communication apparatus control system comprising a free-space optical communication apparatus and a free-space optical communication apparatus control apparatus for controlling the free-space optical communication apparatus, the free-space optical communication apparatus including a communicating section for conducting laser communication, the free-space optical communication apparatus control apparatus including:

at least one processor, the at least one processor carrying out:

a detecting process of detecting an impediment to the laser communication of the free-space optical communication apparatus; and a judging process of judging, in accordance with a state of the impediment to the laser communication, whether pruning of a tree is necessary.

9. A free-space optical communication apparatus control method for controlling a free-space optical communication apparatus, the free-space optical communication apparatus control method comprising:

at least one processor detecting an impediment to laser communication of the free-space optical communication apparatus; and the at least one processor judging, in accordance with a state of the impediment to the laser communication, whether pruning of a tree is necessary.

\* \* \* \* \*